INVENTORS
ALFRED M. HENKE,
WILLIAM A. HORNE &
BRUCE K. SCHMID

INVENTORS
ALFRED M. HENKE,
WILLIAM A. HORNE &
BRUCE K. SCHMID

United States Patent Office 3,493,493
Patented Feb. 3, 1970

3,493,493
PROCESS FOR ENHANCING LUBRICATING OILS
AND A CATALYST FOR USE IN THE PROCESS
Alfred Henke, Springdale, and William A. Horne, Oakmont, Pa., and Bruce K. Schmid, Prairie Village, Kans., assignors to Gulf Research & Development Company, Pittsburgh, Pa., a corporation of Delaware
Continuation-in-part of application Ser. No. 532,427, Mar. 7, 1966. This application Oct. 1, 1968, Ser. No. 767,007
Int. Cl. C10g 23/02, 41/00; C10m 1/02
U.S. Cl. 208—264                    10 Claims

ABSTRACT OF THE DISCLOSURE

A process for producing an enhanced lubricating oil by contacting a crude lubricating oil stock with hydrogen under hydrogenating conditions and a catalyst comprising at least one Group VI metal, its oxide or sulfide and at least one Group VIII metal, its oxide or sulfide supported on an alumina carrier having a cracking activity index of less than about 30 and containing halogen. The total metals content of the catalyst is at least 20 percent by weight of the total catalyst and the metals are present in an atomic ratio of Group VIII metals to Group VI metals in the range from about 2.25:1 to about 6:1.

---

This application is a continuation-in-part of application Ser. No. 532,427, filed Mar. 7, 1966 now abandoned.

Our invention relates to improved catalyst compositions and to processes for the use of these catalysts in the hydrogen treatment of crude lubricating oil stocks.

The upgrading of crude lubricating oil stocks in order to produce improved lubricating oils or lubricating oil base stocks by means of catalytic hydrogenation has previously been suggested in the art. Such previously suggested techniques have usually required the treatment of the crude lubricating oil stocks with hydrogen under conditions of elevated temperature and pressure while employing a catalyst comprising metalliferous hydrogenating components supported on a carrier having a substantial degree of cracking activity such as, for example, siliceous cracking carriers including among other silicaalumina having a cracking activity index from about 35 or 40 up to about 80.

We have discovered, in accordance with our invention, an improved process for the upgrading of crude lubricating oil stocks employing an improved catalyst whereby greater yields of enhanced lubricating oils are obtained which have a higher viscosity index and a lower iodine number than obtained with previously suggested processes and catalysts.

In accordance with our invention, a crude lubricating oil stock is contacted with hydrogen under hydrogenating conditions of elevated temperature and pressure in the presence of a catalyst comprising at least one Group VI metal or its oxide or sulfide together with at least one Group VIII metal or its oxide or sulfide supported on an alumina carrier and containing a halogen. The total metals content of our catalyst constitutes at least 20 percent by weight of the total catalyst and the Group VI and VIII metals are present in an atomic ratio of Group VIII metals to Group VI metals in the range from about 2.25:1 to about 6:1.

It is essential that the catalysts of our invention have a total metals content of at least about 20 percent and preferably have a metals content from about 30 percent to about 50 percent by weight based on the total catalyst. It is also essential that the Group VI and VIII metals employed in the catalyst of our invention are present in the ratios mentioned above. We prefer, however, to employ catalysts wherein the atomic ratio of Group VIII metals to Group VI metals is in the range from about 2.5:1 to about 5.0:1. We have found that catalysts containing both Group VI and VIII metals in ratios other than that required by the catalyst of our invention, although having a total metals content within the range specified for our catalyst, are not effective to produce the advantageous results obtained in accordance with our invention. Similarly, we have found that catalysts containing Group VI and VIII metals within the ranges of atomic ratios required by our invention but having a total metals content outside the range of the catalysts of our invention also fail to produce the advantageous results obtained in accordance with our invention. Thus, it is essential that the catalyst of our invention have both the total metals content mentioned above as well as having the Group VI and VIII metals present in the ratios mentioned previously. It is also essential that the catalyst of our invention contain a combined halogen, usually in an amount from about 0.5 percent to about 10.0 percent by weight of the total catalyst and preferably from about 1.0 to about 4.0 percent by weight.

The carrier employed in our invention must be alumina which material normally has low activity for the promotion of cracking. Generally, it will be found that such aluminas have a cracking activity index below about 35 and even below about 30.

The metalliferous components of our catalyst can comprise any one or more of the Group VI metals together with any one or more of the Group VIII metals. Normally, the metals employed will be the chromium, molybdenum or tungsten metals of Group VI and the iron group metals of Group VIII, i.e. iron, cobalt, or nickel. As mentioned previously, these metalliferous components can be employed either as the metals themselves or the oxides or sulfides of such metals. We prefer, however, to employ the sulfides of the Group VI and VIII metals. A particularly preferred method of operation comprises employing a catalyst wherein the metalliferous components are initially in a substantially unsulfided state such as, for example, a reduced metal state, the oxide of the metal or wherein the metals are only partially sulfided, and then sulfiding the metalliferous components in situ, preferably during the start-up of the hydrogen treating process. We have also found that particularly good results are obtained when employing combinations of nickel, cobalt and molybdenum; nickel and molybdenum; cobalt and molybdenum; and especially nickel and tungsten.

The catalyst of our invention can be prepared employing any of the techniques for the preparation of multicomponent catalysts well-known in the art. Thus, for example, we can prepare our catalyst by impregnating the calcined alumina employing a solution of the salts of the metals as well as the halogen. Generally, one impregnation step is sufficient to provide a catalyst containing up to about 25 percent and sometimes even 30 percent total metals content. However, for catalysts containing a greater metals content than this, particularly the catalysts containing 40 percent metals or more, we have found that two or more impregnation steps are necessary. When employing multiple impregnation steps, we usually dry and calcine the catalyst in between impregnations.

The crude lubricating oil stocks treated in accordance with the process of our invention can be of the type well-known in the art which stocks boil generally in the gas oil or heavy gas oil range and above. Thus, for example, such crude lubricating oil stocks usually boil predominantly above about 600° or 650° F. and include stocks ranging from light distillates to untreated residues obtained from vacuum or atmospheric towers. We have found that the process of our invention is particularly effective in the treatment of crude lubricating oil stocks which have been obtained from a residual material which has been treated so as to lower the sulfur, nitrogen and asphaltene contents to a level below that of the original residue, including residual stocks which have been deasphalted employing a light paraffinic solvent. The process of our invention is also particularly suitable for the treatment of stocks which have been treated for the reduction of aromatic content, such as, for example, the reaffinates from solvent extraction processes including a reaffinate from a Duo-Sol treatment.

While the catalyst and process of our invention are suitable to obtain products having viscosity indices varying over a wide range, we have found that our catalyst and process are particularly suitable when a product have a comparatively high viscosity index is desired. Thus, the catalyst and process of our invention can be advantageously employed to yield a product having a viscosity index in the range from about 120 or 125 up to above 140 or even higher. It should also be pointed out that the production of a product having an enhanced viscosity can be achieved without sacrificing other desirable criteria of the process such as, for example, high yield and low iodine number of product.

In conducting the process of our invention, we employ a temperature in the range from about 600° to about 900° F. and preferably from about 700° to about 800° F., a pressure in the range from about 1000 to about 5000 p.s.i.g. and preferably from about 2000 to about 3000 p.s.i.g., a liquid hourly space velocity from about 0.1 to about 10.0 volumes of crude lubricating oil stock per volume of catalyst per hour and a hydrogen feed rate from about 2000 to about 20,000 s.c.f. of hydrogen per barrel of crude lubricating oil stock, preferably from about 4000 to about 10,000 s.c.f. of hydrogen per barrel of crude lubricating oil stock. It is not necessary that pure hydrogen be employed in the process of our invention and a hydrogen containing stream comprising from about 60 percent to about 99 percent hydrogen is satisfactory. Normally, the hydrogen containing streams generally available in refinery operations containing from about 85 percent to about 90 percent hydrogen can be used.

In the following Examples I through III two different commercially available materials were employed as carriers in the catalyst compositions. One of these supports comprised about 75 percent silica and about 25 percent alumina. This silica-alumina composition is commercially available from American Cyanamid Company under the trade name of "Aerocat Triple A High Alumina Cracking Catalyst." Representative samples of this composition have an average cracking Activity Index of about 76. The other support is comprised substantially entirely of alumina commercially available from the Harshaw Chemical Company under the trade name of "Al–1706." This material has an Activity Index of 18. In the preparation of the catalysts, each of these materials, both the silica-alumina and the alumina, were sized to 10–20 mesh and calcined at 1000° F. for ten hours. This was followed by impregnation with an aqueous solution of ammonium metatungstate and nickel nitrate. In those catalysts containing fluorine the impregnation solution also contained ammonium fluoride. The proportions of ammonium metatungstate and nickel nitrate employed in the individual impregnation steps were varied so as to provide finished, impregnated catalysts with the desired ratios of nickel and tungsten. For the catalysts containing up to 30 percent by weight total metals content, one impregnation step was sufficient. For the catalysts containing higher total metals contents than this, two impregnations were required. The catalysts subjected to two impregnations were oven dried at 250° F. and calcined at 1000° F. for about ten hours between impregnations. After impregnation to deposit the total metals desired, all of the catalysts were oven dried at 250° F. for 24 hours and calcined at 1000° F. for ten hours. Prior to employment in the examples, the catalysts were sulfided with a 10 percent $H_2S$-90 percent hydrogen gas stream (1890 s.t.p. space velocity) for eight hours at 600° F. and atmospheric pressure.

EXAMPLE I

In this example a Duo-Sol raffinate having the inspections shown in Table I below was employed as the charge stock.

TABLE I

| | |
|---|---|
| Gravity: ° API | 29.7 |
| Viscosity, SUV: sec.: | |
| 150° F. | 171 |
| 210° F. | 71.2 |
| Viscosity Index | 110 |
| Pour point: ° F. (D 97) | 90 |
| Color, D–1500 | L 5.5 |
| Sulfur, percent by wt. | 0.12 |
| Iodine No. | 8.0 |
| Aromatics, percent by wt. | 9.3 |
| Saturates, percent by wt. | 90.7 |
| Total nitrogen, percent by wt. | 0.019 |
| Basic nitrogen, p.p.m. | 37 |

This charge stock was processed at a pressure of 2250 p.s.i.g., a liquid hourly space velocity of 1.5 and at temperatures in the range from 707° to about 805° F. in separate runs employing different catalysts in different runs. The particular proportions of metals in each of the catalysts and the supports employed in the catalysts along with yield data is shown in Table II below.

TABLE II

| Catalytic metals, percent by wt. | Total metals, percent by wt. | Support | Ni to W (wt. ratio) | Ni to W (atomic ratio) | 210° F. vis. at 125 VI (SUS) | Yield at 125 VI, (percent by vol. of charge) | Temperature required for 125 VI (° F.) |
|---|---|---|---|---|---|---|---|
| 20% Ni–20% W | 40 | Alumina | 1.0 | 3.13 | 55.2 | 86 | 730 |
| 10% Ni–10% W | 20 | do | 1.0 | 3.13 | 54.7 | 85 | 763 |
| 30% Ni–20% W | 50 | do | 1.5 | 4.70 | 53.0 | 85 | 742 |
| 20% Ni–30% W | 50 | do | 0.67 | 2.09 | 53.0 | 77 | 732 |
| 30% Ni–10% W | 40 | do | 3.0 | 9.40 | 51.5 | 76 | 767 |
| 6% Ni–19% W | 25 | do | 0.3 | 0.99 | 51.5 | 75 | 773 |
| 20% Ni–10% W | 30 | do | 2.0 | 6.27 | 51.0 | 77 | 778 |
| 6% Ni–19% W | 25 | Silica-Alumina | 0.3 | 0.99 | | 62 | 719 |
| 20% Ni–20% W | 40 | do | 1.0 | 3.13 | | 62 | 728 |

All of the above catalysts with the exception of the 20% nickel-20% tungsten on silica-alumina contained 2% fluorine.

From the data in Table II above it will be seen that the first three catalysts of Table II each contained more than 20 percent by weight of total metals and that the atomic ratios of Group VIII metal to Group VI metal of these catalysts were all within the range preferred in our invention, namely, from about 2.5 to about 5.0:1 and that in each of the runs employing these catalysts the yield of 125 VI product obtained was at least about 10 percent higher than the yields obtained in the runs employing other catalysts. It is significant to note that various other catalysts containing from 25 to 40 percent total metals content but having a ratio of Group VIII to Group VI metals outside the range required by our present invention failed to produce the superior results obtained in accordance with our invention.

Illustrative of the superior results obtained in accordance with our inventive process throughout the range of operation described above are the data graphically illustrated in FIGURES 1 through 3 of the attached drawings wherein.

Figure 1:
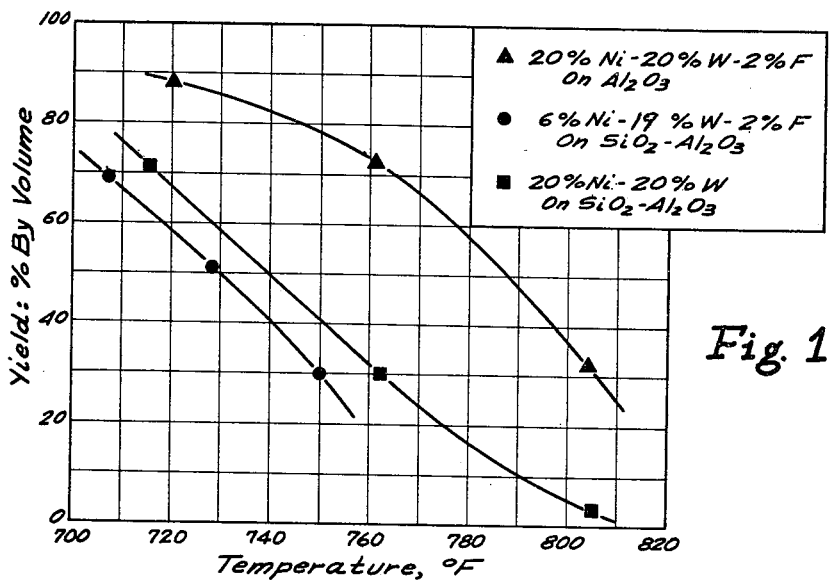
FIGURE 1 is a plot of the yield of 700° F.+ non-dewaxed product (percent by volume of charge) versus temperature required.
Figure 2:
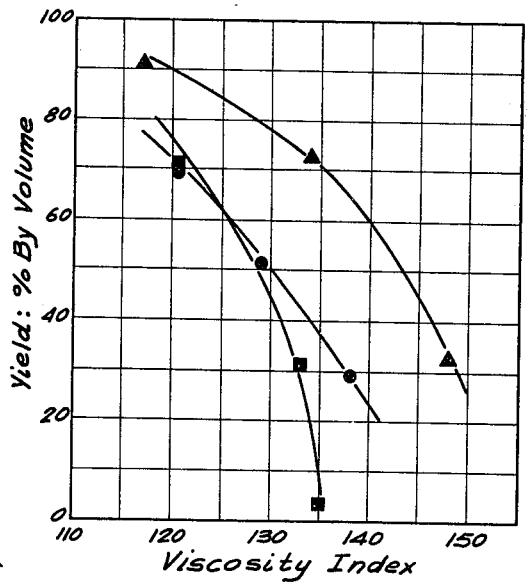
FIGURE 2 is a plot of the yield of 700° F.+ non-dewaxed product (percent by volume of charge) versus the VI of the non-dewaxed product.
Figure 3:
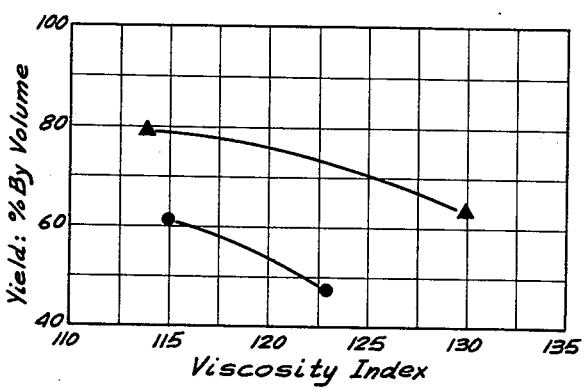
FIGURE 3 is a plot of the yield of 700° F.+ dewaxed product (percent by volume of charge) versus the VI of such product.

In FIGURES 1 and 2 the results obtained when employing a 20% nickel-20%tungsten on alumina catalyst of the present invention are shown as well as the results obtained when employing the same ratio of metals in a 20% nickel-20% tungsten on silica-alumina catalyst as well as a 6% nickel-19% tungsten-2% fluorine on silica-alumina catalyst representative of prior art catalysts. (In all of the figures of the attached drawings the same catalyst is indicated by the same symbol; thus, the triangle indicates the 20% nickel-20% tungsten-2% fluorine on $Al_2O_3$ catalyst, the circle indicates the 6% nickel-19% tungsten-2% fluorine on $SiO_2$-$Al_2O_3$ catalyst, in FIGURES 1 and 2 the square indicates the 20% nickel-20% tungsten on $SiO_2$-$Al_2O_3$ catalyst, and in FIGURES 4 and 5 the diamond indicates a 20% nickel-10% molybdenum-2% fluorine on $Al_2O_3$ catalyst.) By referring to FIGURE 1 it will be seen that the 20% nickel-20% tungsten catalyst of our invention provided an increase in yield ranging from about 20 percent up to about 40 percent throughout the range from 700° to about 805° F. FIGURE 2 illustrates that the process of the present invention employing a 20% nickel-20% tungsten on alumina catalyst not only provided an increase in yield in the range from about 20 percent to about 35 percent for any particular VI product, but also demonstrates that a viscosity index improvement of about 15 or more can be obtained at any particular level of yield over that obtained with either the 20% nickel-20% tungsten on silica-alumina catalyst or the 6% nickel-19% tungsten catalyst. FIGURE 3 illustrates that substantially the same advantage in yield exists between the dewaxed products obtained using the 20% nickel-20% tungsten on alumina catalyst of our invention as opposed to the 6% nickel-19% tungsten-2% fluorine on silica-alumina of the prior art.

EXAMPLE II

In this example samples of the non-dewaxed lubricating oils obtained at various operating temperatures employed in Example I utilizing the 6% nickel, 19% tungsten and 2% fluorine on silica-alumina catalyst and the 20% nickel, 20% tungsten and 2% fluorine on alumina catalyst were tested for color stability. The ASTM D-1500 color for each of the samples obtained at the temperatures indicated in Table III below was initially determined. These samples were then exposed to sunlight for a period of 49 days and, again, the ASTM D-1500 color for each of the samples was determined. These data are shown in Table III below.

TABLE III

| Catalyst | Initial Color | Color After 49 Days in Sunlight |
|---|---|---|
| 6% Ni-19% W-2% F on Silica-Alumina: | | |
| 707° F | <1.5 | 3.5 |
| 729° F | <1.5 | 3.5 |
| 750° F | <1.5 | 3.5 |
| 20% Ni-20% W-2% F on Alumina: | | |
| 720° F | <1.0 | 1.5 |
| 761° F | <1.0 | 1.5 |

From the above data it will be noted that the products obtained in accordance with our invention and employing the 20% nickel-20% tungsten on alumina catalyst initially had a color somewhat lower than the lubricating oils obtained employing a prior art catalyst. Most significantly, however, it will be noticed that the lubricating oils produced in accordance with our invention have a much greater color stability, showing only very slight increase in color during the 49-day test period, than the lubricating oils obtained with the prior art technique, which oils evidenced a substantial increase in color.

EXAMPLE III

In this example the same Duo-Sol raffinate as employed in Example I was subjected to hydrotreatment under conditions substantially the same as those employed in Example I including a liquid hourly space velocity of 1.5, a pressure of 2250 p.s.i.g. and temperatures in the range from about 700° up to about 805° F. Separate runs were conducted employing two different catalysts, one containing 20% nickel, 20% tungsten and no fluorine on an alumina support while the other catalyst contained 20% nickel, 20% tungsten and 2% fluorine. The following Table IV shows the iodine number and the viscosity index of the non-dewaxed products obtained at the nominal temperatures of 720°, 760° and 805° F.

TABLE IV

| | Iodine number | | Viscosity index | |
|---|---|---|---|---|
| | 0% F | 2% F | 0% F | 2% F |
| 720° F | 2.6 | 1.6 | 108 | 122 |
| 760° F | 2.9 | 1.8 | 121 | 134 |
| 805° F | 3.0 | 1.9 | 138 | 148 |

The data in Table IV above clearly indicates that the employment of a catalyst of our invention containing combined halogen is necessary to effect sufficient hydrogenation so as to provide a product having a sufficiently low iodine number, i.e. below about 2.0, and that such catalyst is effective to produce a product having a viscosity index of substantially higher value than obtained with a similar catalyst but not containing combined halogen.

EXAMPLE IV

In this example a deasphalted Ordovician residum having the inspections shown in Table V below was employed as the charge stock.

TABLE V

| | |
|---|---|
| Gravity: ° API | 23.8 |
| Viscosity, SUV: Sec.: | |
| 150° F. | 581 |
| 210° F. | 158 |
| Viscosity Index | 91 |
| Pour Point: ° F. (D 97) | 75 |
| Color, D-1500, dil. | 4.0 |
| Sulfur, percent by wt. | 0.23 |
| Iodine No. | 12.2 |
| Aromatics, percent by wt. | 44.0 |
| Saturates, percent by wt. | 56.0 |
| Total Nitrogen, percent by wt. | 0.063 |
| Basic Nitrogen, p.p.m. | 265 |

Figure 4:
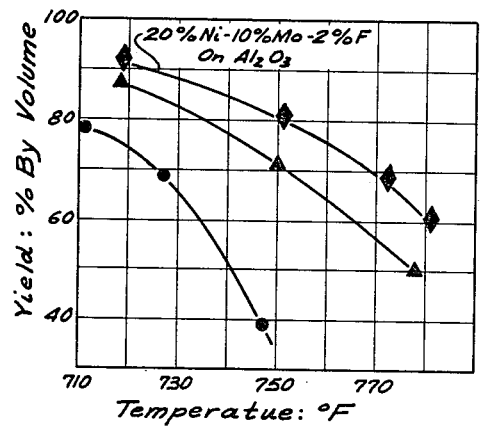
Figure 5:
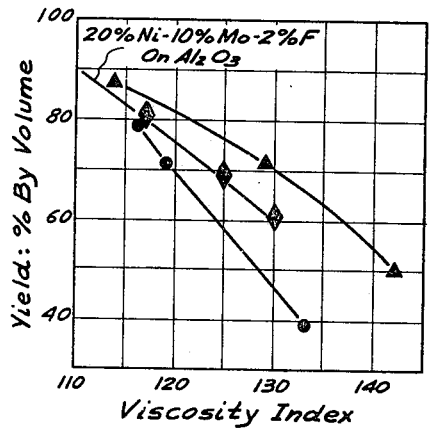
Figure 6:
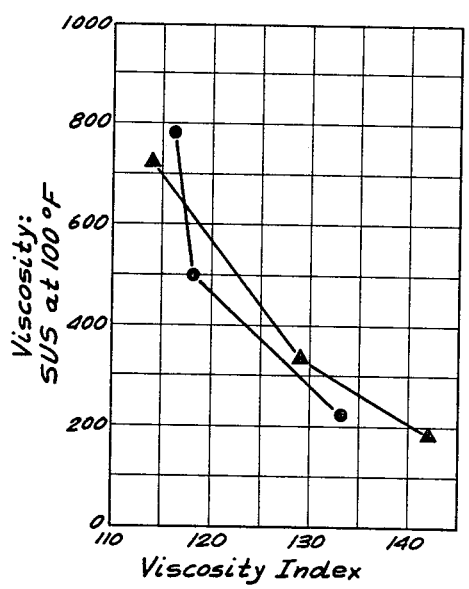
Figure 7:
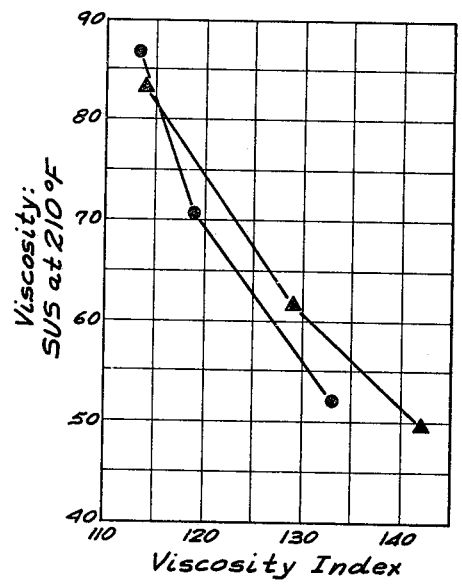
Figure 8:
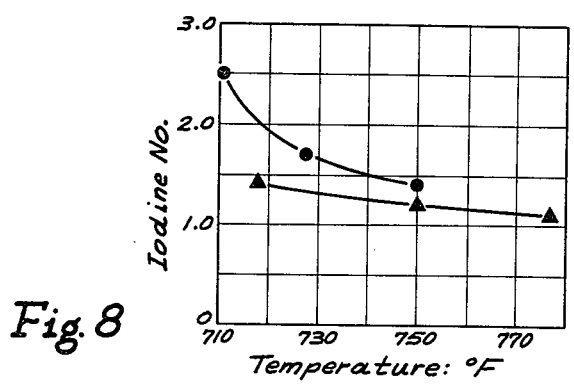

This charge stock was processed at a pressure of 3000 p.s.i.g., a liquid hourly space velocity of 0.5 and at temperatures in the range from 700° to about 780° F. in separate runs employing different catalysts in each run. The particular catalysts employed were the 20% nickel, 20% tungsten and 2% fluorine on alumina catalyst of this invention, the prior art 6% nickel, 19% tungsten and 2% fluorine on silica-alumina catalyst, both of which were described in the previous examples, and two nickel and molybdenum on alumina catalysts. One of these nickel and molybdenum catalysts contained 20% by weight nickel, 20% by weight molybdenum and 2% by weight fluorine on the commercially available alumina described previously while the other contained 20% by weight nickel, 10% by weight molybdenum and 2% by weight fluorine on the alumina described above. In the 20% nickel-20% molybdenum catalyst the atomic ratio of nickel to molybdenum is about 1.64:1, which is outside the range required in accordance with our invention, but the atomic ratio of nickel to molybdenum in the 20% nickel-10% molybdenum catalyst is about 3.28:1, which is within the range required by our invention. These nickel and molybdenum catalysts were prepared in substantially the same manner set forth above regarding the nickel and tungsten catalysts. The metal containing compounds employed in the impregnating solution were nickel nitrate and ammonium molybdate and multiple impregnations were required in the preparation of both catalysts. From the data obtained in these runs, a series of graphs were plotted illustrating the superior results obtained in accordance with our process employing the catalysts of our invention throughout the range of operation described above. These graphs are shown in FIGURES 4 through 8 of the attached drawings wherein:

FIGURE 4 is a plot of the yield of 725° F.+ non-dewaxed product (percent by volume of charge) versus the temperature required;

FIGURE 5 is a plot of the yield of 725° F.+ non-dewaxed product (percent by volume of charge) versus the VI of the product;

FIGURE 6 is a plot of the viscosity of the non-dewaxed product at 100° F. versus the VI of the product;

FIGURE 7 is a plot of the viscosity of the non-dewaxed product at 210° F. versus the VI of the product; and FIGURE 8 is a plot of the iodine number of the product versus the temperature employed.

The results obtained when employing the 20% nickel-20% molybdenum catalyst, not a catalyst of our invention, were not significantly different from the results obtained when employing the prior art 6% nickel-19% tungsten on silica-alumina catalyst. This was particularly so in the range of products having a viscosity index of 125 or greater. Thus, the yield of 725° F.+ non-dewaxed product having a VI of 125 was 59%, only about 2% greater than obtained with the prior art catalyst, and the yield of 129 VI product was 45%, about 3% less than obtained with the 6% nickel-19% tungsten catalyst. In order not to clutter the figures of the drawing with plots of data which are merely cumulative to other data, the data obtained employing the 20% nickel-20% molybdenum catalyt have not been plotted.

Referring now to FIGURE 4, it will be seen that when operating in accordance with our invention and employing the 20% nickel-20% tungsten on alumina catalyst, yields were obtained which ranged from about 10 percent to more than 40 percent greater than the yields obtained when employing a prior art catalyst such as the 6% nickel-19% tungsten on silica-alumina. Similarly, it will be noticed that the 20% nickel-10% molybdenum catalyst of our invention, provided yields which ranged from about 15 percent to more than 50 percent greater than the yields obtained with the prior art 6% nickel-19% tungsten catalyst. Not only does the process of our invention provide a substantial increase in yield over that obtained with prior art techniques, but by referring to FIGURE 5 it will be seen that the process of our invention also provides a greater yield of product having a substantially higher viscosity index than obtained in accordance with previously suggested techniques.

The plot of data in FIGURES 6 and 7 clearly illustrates that when treating a comparatively heavy charge stock, such as the deasphalted residuum of this example, the process of our invention yields products having viscosity indices greater than about 115 or 120 which have a somewhat higher viscosity, both at 100° F. and 210° F., than obtained with a representative prior art catalyst. It wil be realized that production of heavier oils at a given VI is particularly advantageous since high VI oils produced by hydrogen treatment often have viscosities too low to meet specifications for a multi-viscosity oil, e.g. SAE 10W/30 lube oil.

Finally, the plot of the data shown in FIGURE 8 illustrates that the process of our invention is effective to produce a product having an iodine number somewhat lower than was obtained with a prior art catalyst and substantially below 2.0.

EXAMPLE V

In this example a blend of the deasphalted Ordovician residuum of Example IV and Ordovician lube distillates with 4 p.p.m. of added orthofluorotoluene was employed as the charge stock. This blend had an API gravity of 25.8°, an iodine number of 15.7, a viscosity SUS at 210° F. of 64.1 and a viscosity index of 100. The catalyst employed was substantially the same as the 20% nickel-20% tungsten-2% fluorine on alumina catalyst employed in Examples I through IV, with the exception that the catalyst of this example was not presulfided. The initial operating conditions employed included a temperature of 742° F., a gas recycle rate of 5000 s.c.f./b., a total pressure of 3000 p.s.i.g. and a minimum hydrogen partial pressure of 2250 p.s.i. These initial conditions were maintained for a period of three weeks to produce a 116 to 118 VI product (estimated to be 108 to 110 VI dewaxed). During this three week period no deactivation of the catalyst was detected.

In order to accelerate aging the temperature was increased to 763° F. which yielded a 121 to 125 VI non-dewaxed product. This temperature increase also resulted in an increase in API gravity of the product from 30.4° API to 31.8° API. Simultaneously, a decrease in iodine number of about 1 was detected in the product compared to that obtained at 742° F. During the ensuing four weeks, a temperature increase of 4° F. (from 763° to 767° F.) was necessary in order to maintain the 121 to 125 VI product. This represented an increase of only about 1° F. per week, thereby indicating that reasonably long catalyst life can be anticipated. After seven weeks, a check period of about one week operation at the initial 742° F. starting temperature showed that a loss of about 3 VI had occurred in the product representing an overall deactivation for the total period of about 8° F. or about 1° F. per week.

EXAMPLE VI

In this example a blend of 80 percent deasphalted Ordovician residuum and 20 percent Delta lube mixture was employed as the feed stock in a series of runs utilizing different catalysts. The catalysts used in these runs were of three types and a run was made with each basic type catalyst followed by a run employing the same basic type catalyst but containing combined halogen. The purpose of these runs was to demonstrate the effect of adding halogen to catalytic compositions including those of the prior art and the catalyst required in the present invention.

The first catalyst comprised 6 percent by weight nickel and 19 percent by weight tungsten on a carrier composed of about 75 percent by weight silica and 25 percent by weight alumina which carrier had a cracking activity index of about 75. One run was made with this basic catalyst and a comparison run was made wherein 2 percent fluorine had been added to the basic catalyst.

The second type catalyst was composed of 6 percent by weight nickel and 19 percent by weight tungsten on the same alumina support as employed in the catalysts required by our invention and illustrated in the previous examples. Similarly, a comparison run was made wherein 2 percent fluorine had been combined with the basic catalyst.

Finally, a third type catalyst comprising 20 percent by weight nickel and 20 percent by weight tungsten supported on the same alumina carrier employed in the catalysts required by the present invention and shown in the previous examples. Again, a comparison run was made employing the same basic type catalyst to which 2 percent fluorine had been added.

The particular operating conditions employed in each run included a temperature of 780° F., a hydrogen feed rate of 5000 s.c.f. per barrel, a total pressure of 3000 p.s.i.g. and a liquid hourly space velocity of 0.5. The viscosity index for the non-dewaxed 725° F.+ product fraction from each of the runs was then determined. The following Table VI illustrates the effect of adding a halogen to each of the three basic type catalysts mentioned above.

TABLE VI

| Carrier | Other Components | Change in VI Due to Fluorine |
|---|---|---|
| Silica-Alumina (Activity Index 75) | 6% Ni-19% W | +3 |
| Do | 6% Ni-19% W-2% F | |
| Alumina (Activity Index <30) | 6% Ni-19% W | −1.5 |
| Do | 6% Ni-19% W-2% F | |
| Do | 20% Ni-20% W | +11 |
| Do | 20% Ni-20% W-2% F | |

The first two groupings of catalysts shown in Table VI above demonstrate substantially the teachings of the prior art, namely that an enhancement of VI is obtained when a halogen compound is added to a catalyst supported on a carrier having substantial cracking activity. Accordingly, it is seen that the addition of 2 percent fluorine to the 6 percent nickel-19 percent tungsten on silica-alumina catalyst was effective to increase the VI of the product by about 3. In the second group of catalysts shown in Table VI above the support was an alumina having low cracking activity, i.e. less than about 30. The results obtained in the two comparative runs employing first the basic catalyst without fluorine and then the second catalyst of the group containing 2 percent fluorine also illustrates the general teaching of the prior art, namely that the addition of fluorine to a catalyst supported on a carrier of low cracking activity does not in any way enhance the viscosity index of the product material. In fact, as shown in Table VI above, it would appear that the addition of a halogen to a catalyst supported on a carrier of low cracking activity results in a decrease in VI of the product.

In the third pair of catalysts shown in Table VI above it will be noted that, when a halogen is added to a catalyst supported on a carrier of low cracking activity and such catalyst is comprised of a Group VI and Group VIII metal wherein the atomic ratio of Group VIII metal to Group VI metal is greater than about 2.25:1, the addition of the halogen is effective to provide a substantial increase in the VI of the product thereby illustrating the unexpected results obtained in accordance with our invention.

We claim:
1. An improved process for enhancing lubricating oils and improving their viscosity index which comprises contacting a crude lubricating oil stock with hydrogen under hydrogenating conditions including elevated temperatures and pressures in the presence of a catalyst comprising at least one member selected from the group consisting of Group VI metals, their oxides and sulfides, and at least one member selected from the group consisting of Group VIII metals, their oxides and sulfides, supported on an alumina carrier having a cracking activity index below about 30 and containing a halogen, the total metals content constituting at least about 20 percent by weight based on the total catalyst and the Group VI and VIII metals being present in an atomic ratio of Group VIII metals to Group VI metals in the range from about 2.25:1 to about 6:1.

2. The process of claim 1 wherein the total metals content of the catalyst is from about 30 percent to about 50 percent by weight based on the total catalyst.

3. The process of claim 1 wherein the atomic ratio of Group VIII metals to Group VI metals is in the range from about 2.5:1 to about 5.0:1.

4. The process of claim 1 wherein the halogen is fluorine and it is present in an amount from about 0.5 percent to about 10.0 percent by weight based on the total catalyst.

5. The process of claim 1 wherein the Group VI metal is tungsten and the Group VIII metal is nickel.

6. The process of claim 1 wherein the crude lubricating oil stock is a deasphalted residium.

7. The process of claim 1 wherein the contacting is conducted at a temperature in the range from about 600° to about 900° F., a pressure in the range from about 1000 to about 5000 p.s.i.g., a liquid hourly space velocity in the range from about 0.1 to about 10.0 and a hydrogen feed rate in the range from about 2000 to about 20,000 s.c.f. of hydrogen per barrel of crude lubricating oil stock.

8. An improved catalyst for the hydrogen treatment of crude lubricating oil stocks with improvement in viscosity index thereof which comprises at least one member selected from the group consisting of Group VI metals, their oxides and sulfides, and at least one member selected from the group consisting of Group VIII metals, their oxides and sulfides, supported on an alumina carrier having a cracking activity index below about 18 and containing a halogen, the total metals content constituting at least 20 percent by weight based on the total catalyst and the atomic ratio of Group VIII metals to Group VI metals being in the range from about 2.25:1 to about 6:1.

9. The catalyst of claim 8 wherein the total metals content is from about 30 percent to about 50 percent by weight and the halogen is present in an amount from about 0.5 to about 10.0 percent by weight, all based on the total catalyst.

10. The catalyst of claim 8 wherein the Group VI metal is tungsten and the Group VIII metal is nickel and the atomic ratio of Group VIII metal to Group VI metal is in the range from about 2.5:1 to about 5.0:1.

References Cited

UNITED STATES PATENTS

| 3,046,218 | 7/1962 | Henke et al. | 208—109 |
| 3,078,238 | 2/1963 | Beuther et al. | 208—264 |

HERBERT LEVINE, Primary Examiner

U.S. Cl. X.R.

208—18, 143; 252—442, 465